Feb. 4, 1936.                D. K. DEAN                2,029,360

HEAT RECOVERY SYSTEM

Filed Aug. 23, 1935

INVENTOR.

Dim Kanouse Dean

Patented Feb. 4, 1936

2,029,360

UNITED STATES PATENT OFFICE 2,029,360

HEAT RECOVERY SYSTEM

Dion Kanouse Dean, Rahway, N. J., assignor to Foster Wheeler Corporation, New York, N. Y., a corporation of New York Application August 23, 1935, Serial No. 37,447

14 Claims. (Cl. 92—2)

This invention relates to heat recovery systems and more particularly pertains to methods and apparatus for the recovery of heat, and the production of steam from vessels such as paper mill digesters. In paper mill digesters it is customary to heat the contents, which consist largely of water, to temperatures of 300 degrees F. or higher with the result that the pressure within the digester is approximately that corresponding to the pressure of water vapor at a saturation temperature corresponding to that of the liquid contents.

At the end of the cooking period it is customary to release the contents of the digester into vessels under atmospheric pressure by opening a valve. The result is that on account of the pressure release, a considerable amount of evaporation takes place and the latent heat of the vapor formed is likely to be lost. Many efforts have been made to recover the heat in vapors which have been flashed off in this manner, by condensing these vapors by means of water. In certain other schemes pressure within the digester is relieved to a degree before the final blowing, by conducting some of the vapors off the top of the digester and into some means for the absorption and condensing of these vapors. By these methods some of the heat is recovered from the contents of the digester and also certain valuable products. All these means, however, for heat recovery contemplate a recovery of the heat in the form of hot water, or a heated liquid.

The particular object of this invention therefore is to recover the heat in the form of usable steam.

Paper mills provide many uses for relatively low pressure steam such as the operation of evaporators, paper mill dryers and also during the preheating period for the operation of digesters. The steam, however, for all these purposes must be commercially pure and free from corrosive influences.

The invention herein described will make available relatively low pressure commercially pure steam for these purposes.

The various features of novelty which characterize the invention will be understood from the following description considered in connection with the accompanying drawing in which.

Like reference characters refer to like parts throughout the several views.

Figure 1:
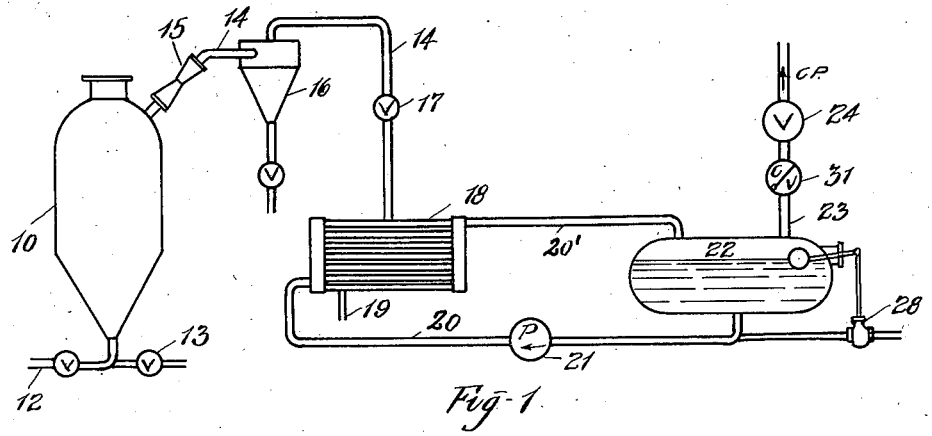
Fig. 1 is a diagrammatic view, partly in section, of the apparatus embodying the invention.

Referring to the drawing particularly Fig. 1, reference character 10 designates a digester provided with blow off connection 12, steam inlet connection 13, and at the top with a vapor release conduit 14 which may have in it a flow limiting device 15 in the form of a Venturi throat for limiting the flow of vapors into and through conduit 14.

A separator 16 receives the vapors flowing through conduit 14 and separates out particles of pulp and liquid which may be carried with the vapors. A throttle valve 17 of any type either manually or automatically operated regulates the flow through conduit 14.

The vapors leaving conduit 14 enter closed heater 18 which is provided with a drain connection 18. Closed heater 19 is supplied with water in a practically closed circuit through conduits 20 and 20¹ by means of pump 21. The water in this circuit does not come in contact with the vapors received from conduit 14 but receives heat from these vapors through tubular surfaces. Within this circuit is provided steam accumulator 22 which has an extensive water storage space and also steam releasing space. Steam accumulator 22 has a steam outlet line 23 fitted with some type of control valve, in this case shown as a constant pressure regulator 24 to maintain a constant pressure at the outlet of the valve. Check valve 31 prevents the back flow of steam into the accumulator in case the pressure in accumulator 22 is lower than the pressure outside of the check valve. Float valve 28 is provided to supply makeup water to the circuit. This float control 28 may be of any type suitable to maintain the proper operating water level.

While the figure shows an accumulator having a considerable water storage space it is obvious that this water storage space could be reduced to an extremely small amount; merely enough to insure that the water circuit is completely filled. This is in case, for instance, that the demand for steam should correspond to the supply from the digester so that steam storage requirements would not have to be provided. In such a case probably the control valve 24 could be eliminated.

Figure 2:
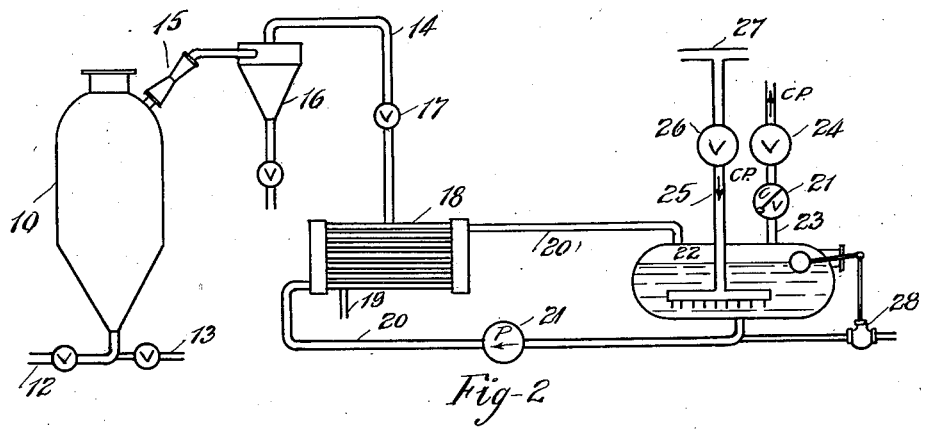
Fig. 2 is similar to Fig. 1 but illustrates a modification of the invention.

Fig. 2 shows the system essentially as shown in Fig. 1 with the addition of a direct steam supply to the accumulator from high pressure steam line 27 through conduit 25. The steam supply in this case would be controlled by some form of regulating valve shown in this case to be a constant pressure regulating valve 26 to open when the pressure within the accumulator should fall below a certain predetermined point. The addition of the direct steam supply to the accumulator is to make this apparatus function not only as a heat recovery device for the recovery of low pressure steam from the digester system, but also for assisting in levelling off the sudden demands for low pressure steam which may be in excess of that which can be recovered from the digester. In this manner as shown in Fig. 2, the accumulator tank fulfills the combined functions of serving as a storage for recovered steam and serving as storage for accommodating the possible fluctuating demand for such low pressure steam.

With the arrangement as shown in both Figs. 1 and 2 it would be the intention to lower the pressure within digester 10 just prior to or during blowing by opening valve 17 and permitting a flow of steam and vapors from the top of the digester. The water circulating through conduits 20 and 20¹ and closed heater 18 would condense the steam passing through conduit 14 and would thereby be heated and discharged into the accumulator with the result that the temperature of the water in storage in the accumulator would be built up by an amount corresponding to the heat absorbed in closed heater 18 and the steam space would be filled with uncontaminated steam at a pressure corresponding to the saturation temperature of the water in the accumulator. As the vapors are carried off through conduit 14 the temperature of the contents of the digester would fall and the temperature of the water in accumulator 22 would rise.

The minimum pressure within the digester at which this recovery system would operate would depend upon local conditions and would be the pressure necessary to discharge the contents of the digester. The temperature of the water in the accumulator and the corresponding pressure of the vapor contained in the steam space could rise to a maximum slightly less than the minimum temperature and pressure of the contents of the digester.

By a proper selection of the size of the accumulator with respect to the size of the digester it would be possible to have available as low pressure steam an amount slightly less than that of the steam discharged from digester 10 through conduit 14.

As an example of what may be accomplished in this manner, it might be noted that if a digester operating initially under a steam pressure of 125 lbs. per sq. in. should be discharged through a closed heater in the manner indicated until the digester pressure should fall to 60 lbs. per sq. in., there would be available from the accumulator approximately 3 pounds of steam under a pressure of 25 lbs. per sq. in. gauge per cubic foot of digester content.

It will be understood that the condensation and non-condensable vapors released through drain connection 19 of closed heater 18 may be put to further use. For example, the condensation may be mixed with the fresh charge of liquor for subsequent filling of a digester and the non-condensable vapors can be vented off to a suitable absorption system or could be burned.

It will also be apparent that beyond the limitations of this system there are still possibilities of heat recovery from the digester system. For example, in the case cited, if the digester pressure were lowered to 60 lbs. per sq. in. during the steam recovery period and if the closed heater-accumulator circuit were designed to operate with this minimum pressure there would still be available within the contents of the digester an appreciable amount of heat between the temperature corresponding to 60 lbs. per sq. in. gauge and any lower temperature at which further recovery of heat might be desired.

Figure 3:
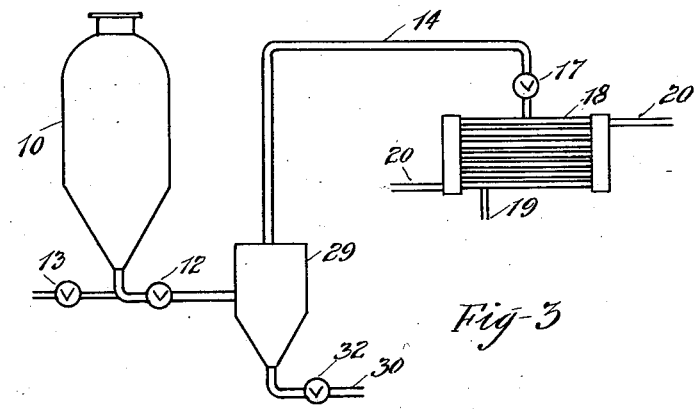
Fig. 3 shows a still further modification of the invention.

Fig. 3 shows an alternative method of lowering the pressure in the digester and supplying steam to the closed heater of the system.

A closed blow pit 29 with discharge line 30 is provided and would receive the pulp during the period of blowing directly from blow pipe 12. Valve 32 would be controlled so that pressure within blow pit 29 would not fall below a point which would be suitable for proper blowing of the pulp. Conduit 14 would receive the steam flashed off from blow pit 29 and conduct it to closed heater 18, as shown in Figs. 1 and 2. It is assumed that blow pit 29 will also serve as a separator. The remainder of the operation would be the same as in Fig. 1 or Fig. 2. In this manner, instead of flashing steam directly from the top of the digester the steam would be flashed off after leaving the digester. This sometimes might have its advantages as the steam release could be such as not to cause undue priming of the liquor which might occur in cases in which the steam is taken off from the top of the digester. It is understood that in case of such operation all valves may be either manually or automatically controlled.

In connection with the accumulator operation there has been shown a very simple method of control namely, as shown in Fig. 1, the valve 24 would merely open sufficiently to maintain a predetermined pressure at its outlet whenever pressure in accumulator 22 should be higher than this predetermined pressure. Check valve 31 would prevent the back flow of steam in case the pressure in the accumulator should be lower than this predetermined pressure. In Fig. 2 in addition to the provisions of Fig. 1 constant pressure valve 26 would be closed normally while the pressure within the accumulator is above a certain predetermined value but in case an unduly large amount of steam should be drawn off through line 23 valve 26 would open to supply a certain amount of steam until the pressure within the accumulator should again rise to the predetermined value, in this way making it possible to store within the accumulator an amount of steam which might be available for sudden demands.

Accordingly a heat recovery system embodying the invention described will provide a supply of non-contaminated reduced pressure steam available for continuous or sudden demands when used in conjunction with a digester operating initially at a steam pressure higher than that of the recovered steam.

It will be understood that any system of control, manual or automatic, for the operation of any part of the apparatus herein disclosed may be utilized without departing from the principles of the invention which is not to be limited except by the scope of the appended claims.

What I claim is:

1. A heat recovery system comprising a digester, means for withdrawing steam and vapors from said digester, means for condensing the steam and vapors, and means for recovering heat in the form of low pressure steam from said steam and vapors.

2. In a heat recovery system the combination of a digester, a closed heater, means for conducting vapors from the digester to the heater, means for condensing said vapors in said heater and recovering heat therefrom, means for conducting said heat to a steam accumulator, and means for releasing said heat in the form of low pressure steam.

3. In a heat recovery system the combination of a digester, means for withdrawing steam from said digester, a closed heater, a conduit for conducting said steam to the closed heater, a water circuit through said closed heater for condensing the steam and recovering heat therefrom, and a steam accumulator for storing said heat.

4. A heat recovery system comprising a digester, means for releasing high pressure vapors and steam from said digester, means for condensing said vapors and steam, a steam accumulator, means for conducting heat recovered from said vapors and steam to said steam accumulator and means for releasing low pressure steam from said steam accumulator.

5. The method of operating a digester including the steps of releasing vapors from the digester, condensing the released vapors, recovering heat thereby, and generating steam by said heat at a pressure lower than that at which the vapors are released.

6. The method of operating a digester including the steps of reducing the pressure within the digester by releasing steam and vapors therefrom, condensing the steam and vapors, and regenerating non-contaminated steam at a pressure lower than the pressure of the steam and vapors released from the digester.

7. The method of operating a digester comprising the steps of reducing the pressure within the digester by releasing steam and vapors from the digester, condensing the said steam and vapors, storing the heat recovered thereby, regenerating steam by said heat and releasing said steam at a pressure lower than that at which it is released from the digesters.

8. The method of operating a digester comprising the steps of reducing the pressure within the digester by releasing steam and vapors from the digester, condensing the said steam and vapors, storing the heat recovered thereby, regenerating non-contaminated steam by said heat and releasing said steam at a pressure lower than that at which it is released from the digesters.

9. The method of operating a digester comprising the steps of reducing the pressure within the digester by releasing vapors from the digester, condensing the vapors, storing the heat recovered therefrom, regenerating steam by said heat, and controlling the pressure of the regenerated steam.

10. The method of operating a digester including the steps of relieving the vapor pressure within the digester to a point higher than the ultimate discharge pressure, recovering the heat released, and regenerating steam at a pressure lower than that at which the vapors are released but higher than the ultimate discharge pressure.

11. The method of operating a digester including the steps of relieving the vapor pressure within the digester, recovering and storing the heat discharged, storing additional heat, regenerating steam, and controlling the pressure of the regenerated steam.

12. A method of recovering heat from high pressure contaminated steam that comprises the steps of condensing the steam, conducting the heat recovered to a vessel under lower pressure than the steam, and evaporating low pressure steam by the recovered heat.

13. A method of recovering heat from high pressure contaminated steam that comprises the step of condensing the steam, conducting the heat recovered to a vessel under lower pressure than the steam, storing the heat recovered within the vessel, and evaporating low pressure steam by the recovered heat.

14. The method of operating a digester including the steps of relieving the vapor pressure within the digester to a point higher than the ultimate discharge pressure, recovering the heat released, and regenerating steam at a pressure lower than that at which the vapors are released.

DION KANOUSE DEAN.